C. M. BORLAND.
TRACTOR PUSH RAKE.
APPLICATION FILED MAY 14, 1920.
1,383,184.
Patented June 28, 1921.
3 SHEETS—SHEET 2.
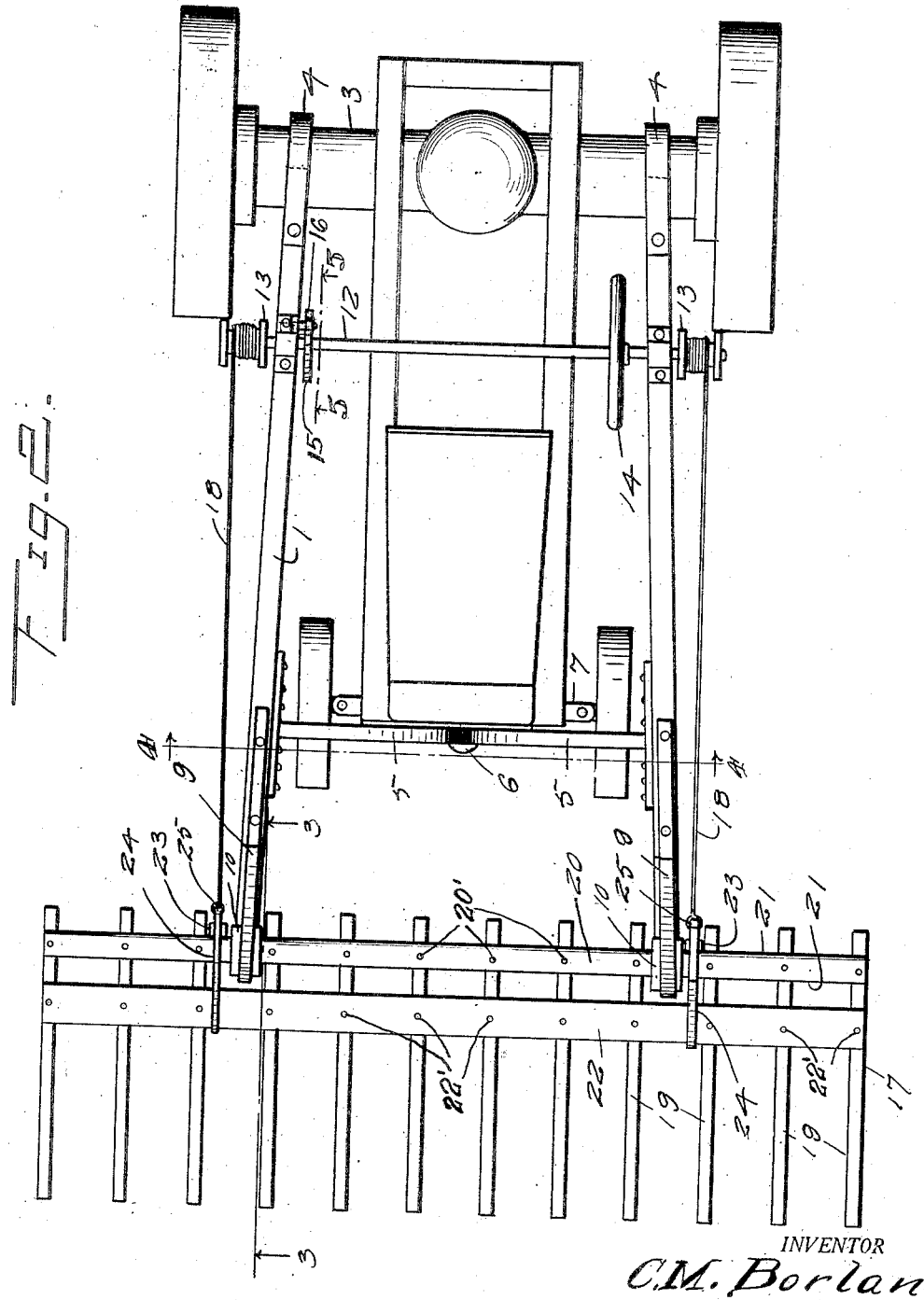
INVENTOR
C. M. Borland
BY
ATTORNEY.

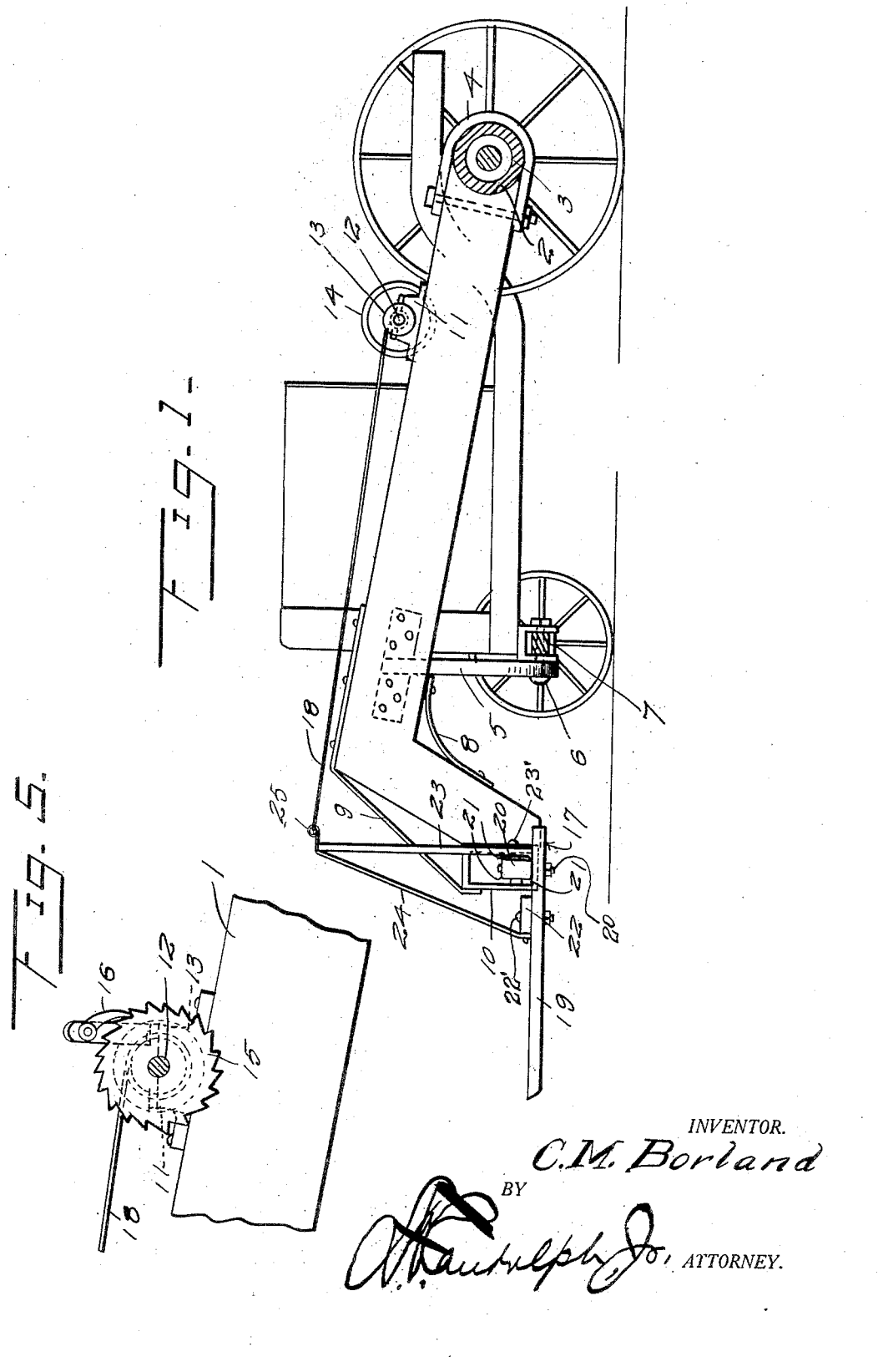

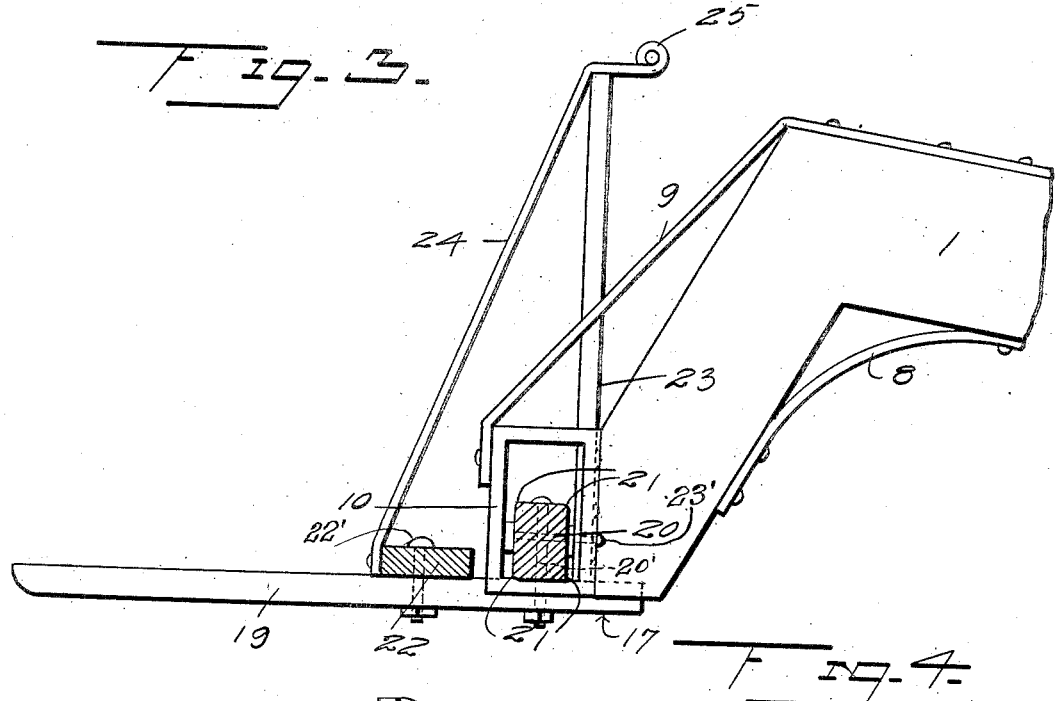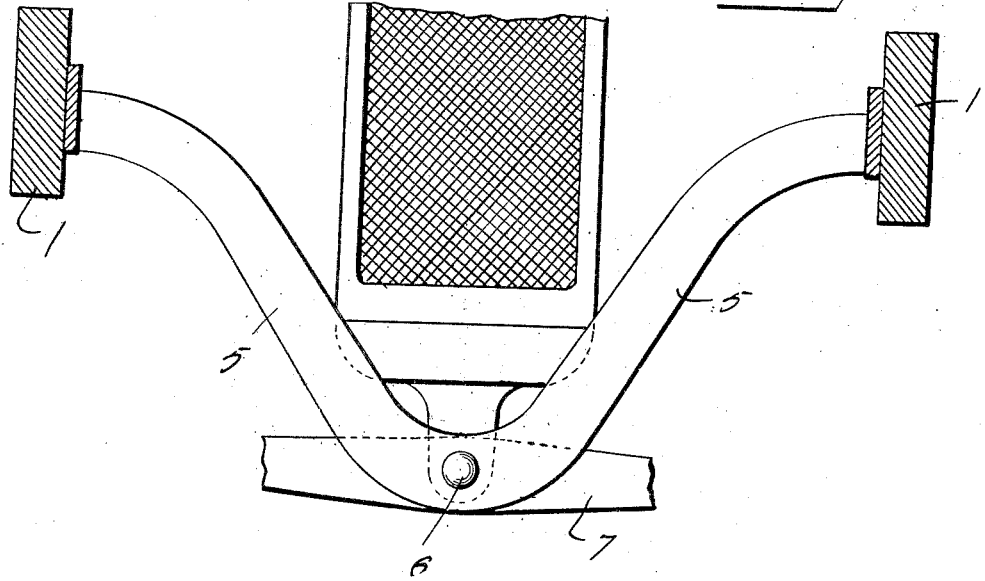

UNITED STATES PATENT OFFICE.

CHARLES M. BORLAND, OF ECHO, OREGON, ASSIGNOR OF ONE-HALF TO ALFRED HAITT, OF ECHO, OREGON.

TRACTOR PUSH-RAKE.

1,383,184.  Specification of Letters Patent.  Patented June 28, 1921.

Application filed May 14, 1920. Serial No. 381,393.

*To all whom it may concern:*

Be it known that I, CHARLES M. BORLAND, a citizen of the United States, residing at Echo, in the county of Umatilla and State of Oregon, have invented certain new and useful Improvements in Tractor Push-Rakes; and I do hereby declare the following to be a full, clear, and exact description of the invention, such as will enable others skilled in the art to which it appertains to make and use the same.

This invention relates to push rake attachments adapted to be applied to automobile tractors or simple machines and it consists in the novel features hereinafter described and claimed.

An object of the invention is to provide a push rake of the character stated which is of simple and durable structure and which when applied as indicated may be easily and conveniently manipulated to cause the same to gather or collect the hay from the surface of the ground, elevate the same sufficiently to clear the surface of the ground while the hay is being moved from the field to the vicinity of the stack and to lower the hay in contact with the surface of the ground when depositing the same at the stack.

With this object in view the push rake attachment comprises beams adapted to be secured at their ends with the rear axle of the tractor, the said beams being connected together at points between their ends by a yoke which is adapted to be pivotally connected with the front axle of the tractor at a point midway between the ends thereof. The said beams are approximately L-shape in side elevation and the angles or corners of the said beams formed between the end portion thereof, are upwardly disposed when the beams are applied to the tractor and the said yoke is connected with the beams in the vicinity of the said angles or corners. Loops are carried at the lower forward portions of the beams and a rake cradle is pivoted for limited swinging movement in the loops. A shaft is journaled for rotation transversely across the rear portions of the beams and carries at its ends winding drums and cables connecting the drums with the said cradle, whereby the cradle may be swung.

In the accompanying drawings:—

Figure 1 is a side elevation of the push rake applied to a tractor.

Fig. 2 is a top plan view of the same.

Fig. 3 is a detailed view of the push rake detached.

Fig. 4 is a detail section on the plane of line 4—4 of Fig. 2.

Fig. 5 is a detail section on the plane of line 5—5 of Fig. 2.

The push rake attachment comprises side beams 1 which are approximately L-shaped in side elevation. The said beams 1 are provided at one end with half bearings 2 adapted to bear against the forward side of the axle 3 of the tractor when the rake is applied. Half bearings 4 are attached to the beams 1 and bear against the rear side of the axle 3.

As stated, the beams 1 are approximately L-shape in side elevation and when the said beams are applied, the corners or angles thereof are disposed at the forward portion of the tractor and extend over the forward wheels thereof. A yoke 5 is connected at its ends with the beams 1 and its intermediate portion is downwardly bowed or curved and bridges the space between the beams. The lower intermediate portion of the yoke 5 is pivotally connected by means of a pin 6 with the front axle 7 of the tractor at a point midway between the ends of the said axle. Bracing strips 8 and 9 are connected with the forward angled portions of the beams 1. Approximately rectangular loops 10 are attached to the forward sides of the forward ends of the beams and the lower ends of the strips 9 are connected with the said loops 10. Bearings 11 are mounted upon the upper edges of the rear portions of the beams 1 and a shaft 12 is journaled in said bearings. The shaft 12 carries at its ends drums 13.

A hand wheel 14 is mounted upon the shaft 12 and a ratchet wheel 15 is mounted thereon. A pawl 16 is pivotally mounted upon an upstanding extension of one of the bearings 11 and is adapted to engage the ratchet wheel 15 and when in engagement therewith prevents rotation thereof in one direction. The pawl 16 may be readily disengaged from the ratchet wheel 15 by hand, when desired, or, if preferred, any suitable and well known disengaging means may be provided. A cradle 17 indicated in general is pivoted for slight swinging movement in the loops 10 and cables 18 are connected at their forward ends with the upper portion of the cradle 17 and the rear ends of the cables 18 are arranged to wind upon the drums 13 hereinbefore described. Therefore, it will be seen that means are provided and may be manually operated for swinging the cradle. The cradle structure 17 includes tines 19, pointed at their forward ends and secured at their rear ends to a transversely disposed beam 20 by bolts 20' or other suitable means. The beam 20 is provided at its ends with rounded corner portions 21 and these end portions of the beam 20 are loosely mounted in the loops 10 hereinbefore described and may turn therein, slightly, but are restrained by reason of their relative transverse dimensions with relation to the openings in the loops from making complete revolutions therein. A cross piece 22 is mounted upon the intermediate portion of the tines 19 by bolts 22' or the like and extends transversely across the same. The cross piece is located in advance of the forward sides of the loops 10 and is spaced sufficiently from the beam 20 to permit of the slight turning movement hereinbefore described. Uprights 23 are attached to the rear sides of the beam 20 as shown at 23' and bracing strips 24 are connected with the upper ends of the uprights 23 and connected at their lower ends with the forward edge of the cross piece 22. These bracing strips are located at the ends of the cradle structure. The upper rear ends of the strips 24 are extended rearwardly of the uprights 23 and formed into loops 25 with which the forward ends of the cables 18 hereinbefore described are connected.

When the push rake attachment is applied to the tractor and while in operation and gathering the hay, the cables 18 are slack and by gravity the tines 19 are forwardly and downwardly inclined and the forward pointed ends rest upon the surface of the ground.

As the machine passes over the surface of the ground, the pointed ends of the tines pass under the hay and the same is gathered upon the upper surfaces of the tines. When a sufficient quantity of hay has been collected in the cradle, the operator uses the hand wheel 14 and turns the shaft 12 whereby the cables are made taut and wound upon the drums 13. Thus the cradle 17 is swung in the loops 10 as hereinbefore described and the forward pointed ends of the tines are elevated above the surface of the ground and while in this position, the machine to which the attachment is applied is moved or directed toward the stack or place of deposit. When this place is reached the cables 18 are permitted to become slack and the forward ends of the tines 19 are lowered and come in contact with the surface of the ground. The machine is then backed and the hay slips from the tines and deposits upon the surface of the ground.

The yoke 5 is pivotally connected with the axle 7 at a point midway between the ends thereof in order that the axle may swing and pass over uneven surfaces or places upon the ground and while doing so, the forward ends of the tines may rest upon the surface of the ground.

Having described the invention what is claimed is:

1. A push rake attachment comprising beams which are approximately L-shape in side elevation, bearings provided at one end of the beams for receiving the axle of the tractor, a yoke connecting the beams together and adapted to be pivotally connected with the forward axle of the tractor, a cradle mounted upon the beams and means mounted upon the beams for swinging the cradle.

2. A push rake attachment comprising beams having bearings adapted to be connected with the rear axle of a tractor, a yoke connected with the intermediate portion of the beams and adapted to be pivotally connected with the front axle of the tractor, a cradle pivotally mounted upon the beams and means mounted upon the beams for swinging the cradle.

3. A push rake attachment comprising beams, means for attaching the beams to a tractor, loops carried by the beams and being substantially rectangular in shape, a beam having rounded end portions loosely mounted in the loops but restrained against revolution therein, tines carried by the last mentioned beam and means mounted upon the first mentioned beams for swinging the cradle.

4. A push rake attachment comprising beams, means for attaching the beams to a tractor, loops mounted upon the beams and being substantially rectangular in shape, a beam loosely mounted in the loops, tines attached to the last mentioned beam, a cross piece attached to the tines in advance of the loops, uprights mounted upon the last mentioned beam, braces connecting the uprights with the cross piece and means mounted upon the first mentioned beams and connected with the braces for swinging the last mentioned beam.

In testimony whereof I affix my signature in presence of two witnesses.

CHARLES M. BORLAND.

Witnesses:
 IRA M. PETERSON,
 R. B. STANFIELD.